US006503417B1

United States Patent
Bivens et al.

(10) Patent No.: US 6,503,417 B1
(45) Date of Patent: Jan. 7, 2003

(54) TERNARY COMPOSITIONS OF AMMONIA, PENTAFLUOROETHANE AND DIFLUOROMETHANE

(75) Inventors: Donald Bernard Bivens, Kennett Square, PA (US); Akimichi Yokozeki, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/290,315

(22) Filed: Apr. 12, 1999

Related U.S. Application Data

(60) Provisional application No. 60/081,496, filed on Apr. 13, 1998.

(51) Int. Cl.[7] ................................................. C09K 5/04
(52) U.S. Cl. .......................... 252/67; 510/409; 510/410; 62/114
(58) Field of Search ............................ 252/67; 510/409, 510/410; 62/114

(56) References Cited

U.S. PATENT DOCUMENTS

| | | | |
|---|---|---|---|
| 5,357,782 A | 10/1994 | Henry | 73/40.7 |
| 5,387,357 A | 2/1995 | Shiflett et al. | 252/67 |
| 5,403,504 A * | 4/1995 | Bivens et al. | 252/67 |
| 5,595,678 A | 1/1997 | Short | 252/68 |
| 5,908,818 A * | 6/1999 | Egawa et al. | 508/579 |

FOREIGN PATENT DOCUMENTS

| | | | |
|---|---|---|---|
| JP | 08-245952 | * | 9/1996 |
| WO | WO 94/16029 | | 7/1994 |
| WO | WO 95/00600 | | 1/1995 |

OTHER PUBLICATIONS

C.–P. Chai Kao; M. E. Paulaitis; A. Yokozeki, Double Azeotrophy in binary mixtures of NH3 and CHF2CF3, Center for Molecular and Engineering Thermodynamics, Department of Chemical Engineering, University of Delaware, Newark, DE 19716, USA, 1997, 127(1–2), 191–203.
Takayuki Namiki; Kosei Oguchi, Prediction of the Characteristics of a Refrigeration Cycle with Nonazeotropic Refrigerant Mixtures, Dep. Mech. Eng., Kanagawa Inst. Technol., Atsugi, Japan, (1995) B–19, 21–31—Abstract Only.

* cited by examiner

Primary Examiner—Margaret Einsmann
(74) Attorney, Agent, or Firm—Mark A. Edwards

(57) ABSTRACT

Disclosed are ternary azeotropic, azeotrope-like, and zeotropic compositions of ammonia, pentafluoroethane and difluoromethane. These compositions are useful as refrigerants, and particularly as high capacity and efficiency alternatives to binary mixtures of difluoromethane and pentafluoroethane.

4 Claims, 3 Drawing Sheets

TERNARY COMPOSITIONS OF AMMONIA, PENTAFLUOROETHANE AND DIFLUOROMETHANE

This application claims benefit of provisional application 60/081,496 filed Apr. 13, 1998.

FIELD OF THE INVENTION

The present invention relates to ternary azeotropic, azeotrope-like, or zeotropic compositions of ammonia ($NH_3$), pentafluoroethane (HFC-125) and difluoromethane (HFC-32). The present invention further relates to refrigeration processes using these compositions.

BACKGROUND OF THE INVENTION

In recent years it has been argued that chlorine-containing refrigerants released into the atmosphere may adversely affect the stratospheric ozone layer. As a result, there is a movement toward the elimination of the use and the production of chlorofluorocarbons (CFCs) and hydrochlorofluorocarbons (HCFCs) under an international agreement.

Accordingly, there is a demand for the development of refrigerants that have a lower ozone depletion potential than existing refrigerants while still achieving an acceptable performance in refrigeration applications. Hydrofluorocarbons (HFCs) are being used as replacements for CFCs and HCFCs since HFCs contain no chlorine and therefore have zero ozone depletion potential.

In refrigeration applications, refrigerant is often lost during operation through leaks in shaft seals, hose connections, soldered joints and broken lines. In addition, refrigerant may be released to the atmosphere during maintenance procedures on refrigeration equipment. If the refrigerant is not a pure component or an azeotropic or azeotrope-like composition, the composition of the refrigerant may change when leaked or discharged to the atmosphere from the refrigeration equipment, which may cause the refrigerant to become flammable or to have poor refrigeration performance.

Accordingly, it is desirable to use as a refrigerant a single fluorinated hydrocarbon or an azeotropic or azeotrope-like composition that includes two or more fluorinated hydrocarbons. One azeotropic composition already identified as a chlorodifluoromethane (HCFC-22) alternative is a 50/50 weight percent mixture of difluoromethane and pentafluoroethane.

Refrigerant compositions which are non-azeotropic, i.e., zeotropic, may also be useful in certain vapor compression systems. Zeotropic mixtures can boil over a wide temperature range under constant pressure conditions and create a temperature glide in the evaporator and the condenser. This temperature glide can reduce the energy required to operate the system by taking advantage of the Lorenz cycle. The preferred method involves the use of counter flow evaporator and/or condenser heat exchangers in which the refrigerant and heat-transfer fluid flow in a counter-current fashion. This method decreases the temperature difference between the evaporating and condensing refrigerant but maintains a high enough temperature difference between the refrigerant and external heat-transfer fluid to effectively transfer heat. Another benefit of this type of system is that the pressure differences are also minimized. This can result in an improvement in energy efficiency and/or capacity versus conventional systems.

For the foregoing reasons, there is a need for ternary compositions that are useful as refrigerants, and particularly as high-capacity and high-efficiency alternatives to binary compositions of difluoromethane and pentafluoroethane.

SUMMARY OF THE INVENTION

The present invention is directed to ternary compositions comprising ammonia, pentafluoroethane, and difluoromethane that satisfy the aforesaid refrigerant needs, as well as high-capacity and high-efficiency alternatives to binary compositions of difluoromethane and pentafluoroethane. The compositions of the present invention include azeotropic, azeotrope-like, and zeotropic compositions of ammonia, pentafluoroethane, and difluoromethane. The present invention further relates to processes for transferring heat using ternary compositions comprising ammonia, pentafluoroethane, and difluoromethane.

DETAILED DESCRIPTION

Figure 1:
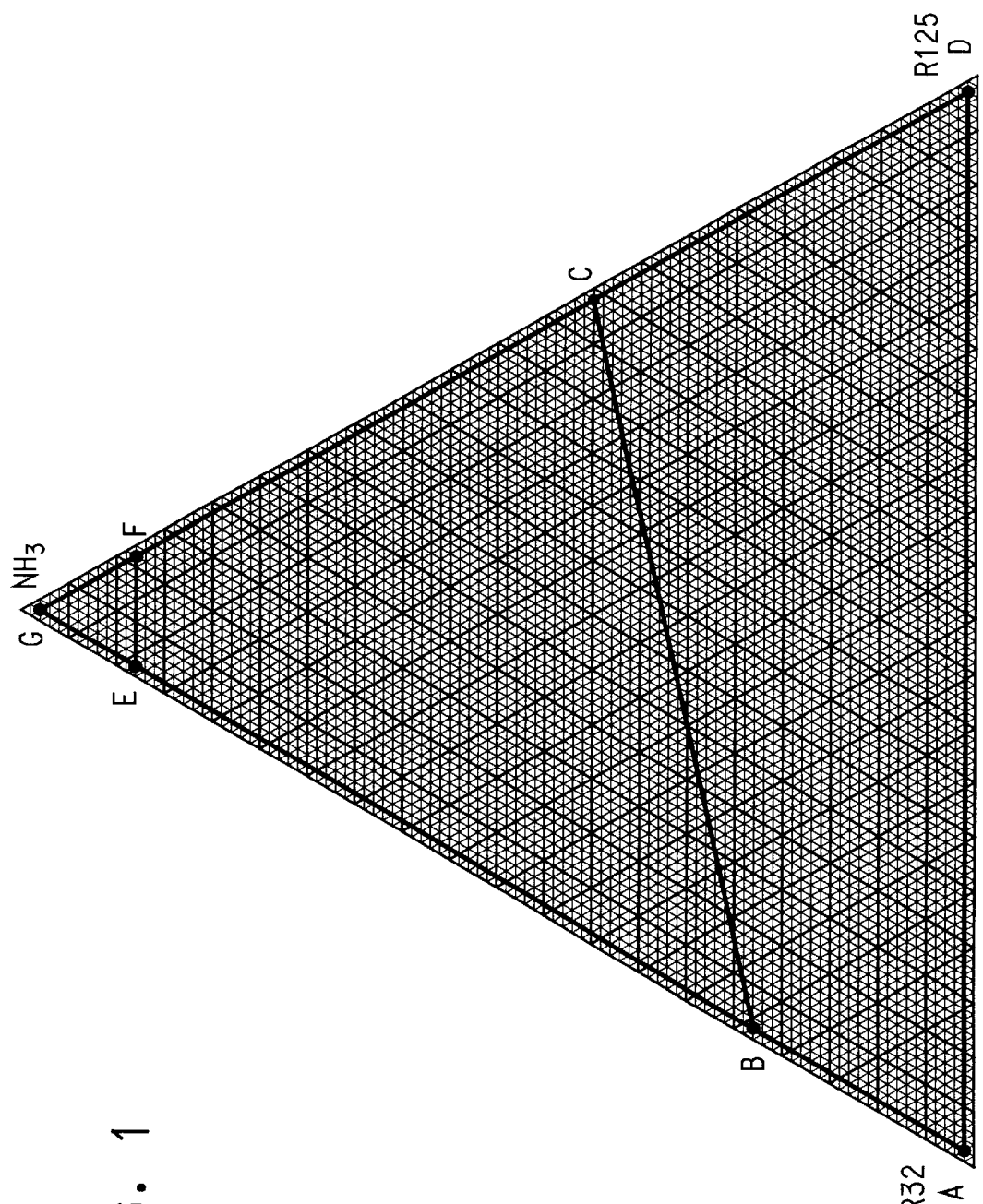
FIG. 1 is a ternary composition diagram represented in triangular coordinates and describes the present ternary refrigerant compositions.

The present invention relates to the discovery of ternary refrigerant compositions of ammonia ($NH_3$, normal boiling point of $-33.4°$ C.), pentafluoroethane (BFC-125, $CF_3CHF_2$, normal boiling point of $-48.5°$ C.) and difluoromethane (HFC-32, $CH_2F_2$, normal boiling point of $-51.7°$ C.). The present inventors have discovered that ternary compositions comprising 1–98 wt. % of ammonia, pentafluoroethane, and difluoromethane are useful as refrigerants, and particularly as high-capacity and high-efficiency alternatives to binary mixtures of difluoromethane and pentafluoroethane.

By azeotropic is meant a constant boiling liquid mixture of two or more substances that behaves as a pure compound. One way to characterize an azeotropic composition is that the vapor produced by partial evaporation or distillation of the liquid has the same composition as the liquid from which it was evaporated or distilled, that is, the mixture distills/refluxes without compositional change. Constant-boiling compositions are characterized as azeotropic because they exhibit either a maximum or minimum vapor pressure or boiling point, as compared with that of the non-azeotropic mixtures of the same components.

By azeotrope-like composition is meant a constant boiling, or substantially constant boiling, liquid mixture of two or more substances that behaves as a pure compound. One way to characterize an azeotrope-like composition is that the vapor produced by partial evaporation or distillation of the liquid has substantially the same composition as the liquid from which it was evaporated or distilled, that is, the mixture distills/refluxes without substantial composition change. Another way to characterize an azeotrope-like composition is that the bubble point vapor pressure and the dew point vapor pressure of the composition at a particular temperature are substantially the same. Herein, a composition is azeotrope-like if, after 50 weight percent of the composition is removed such as by evaporation or boiling off, the difference in vapor pressure between the original composition and the composition remaining after 50 weight percent of the original composition has been removed is less than about 10 percent. If an azeotrope is present, there is no difference in vapor pressure between the original composition and the composition remaining after 50 weight percent of the original composition has been removed.

The present invention includes ternary compositions comprising effective amounts of ammonia, pentafluoroethane and difluoromethane which form azeotropic or azeotrope-like compositions. These compositions may be defined by the area enclosed by the following lines in FIG. 1, a ternary composition diagram of $NH_3$ (ammonia) HFC-125 (pentafluoroethane), and HFC-32 (difluoromethane): a straight line connecting point A ($NH_3$/HFC-125/HFC-32=1/1/98 wt %) to point B ($NH_3$/HFC-125/HFC-32=23/1/76 wt %), a straight line connecting point B to point C ($NH_3$/HFC-125/HFC-32=40/59/1 wt %), a straight line connecting point C to point D ($NH_3$/HFC-125/HFC-32=1/98/1%) and a straight line connecting point D to point A. A second azeotrope-like composition is defined by the area enclosed by the following lines: a straight line connecting point E ($NH_3$/HFC-125/HFC-32=88/1/11 wt %) to point G ($NH_3$HFC-125/HFC-32=98/1/1 wt %), a straight line connecting point G to point F ($NH_3$/HFC-125/HFC-32=88/11/1 wt %), and a straight line connecting point F to point E. A preferred composition range is 5–25 weight percent $NH_3$, 1–94 weight percent HFC-125 and 1–94 weight percent HFC-32; a particularly preferred range is 5–20 weight percent $NH_3$, 1–89 weight percent HFC-125 and 1–89 weight percent HFC-32; and a most preferred composition range is 5–15 weight percent $NH_3$, 20–70 weight percent HFC-125 and 20–70 weight percent BFC-32.

For compositions that are azeotropic, there is a range of compositions around the azeotrope point that, for a maximum boiling azeotrope, have boiling points at a particular pressure higher than the pure components of the composition at that pressure and have vapor pressures at a particular temperature lower than the pure components of the composition at that temperature, and that, for a minimum boiling azeotrope, have boiling points at a particular pressure lower than the pure components of the composition at that pressure and have vapor pressures at a particular temperature higher than the pure components of the composition at that temperature. Boiling temperatures and vapor pressures above or below that of the pure components are caused by unexpected intermolecular forces between and among the molecules of the compositions, which can be a combination of repulsive and attractive forces such as van der Waals forces and hydrogen bonding. The vapor pressures of the pure components of the present compositions at 12.7° C. are: ammonia (674.2 kPa), pentafluoroethane (985.4 kPa), and difluoromethane (1194.6 kPa).

The range of compositions that have a maximum or minimum boiling point at a particular pressure, or a maximum or minimum vapor pressure at a particular temperature, may or may not be coextensive with the range of compositions that have a change in vapor pressure of less than about 10% when 80 weight percent of the composition is evaporated. In those cases where the range of compositions that have maximum or minimum boiling temperatures at a particular pressure, or maximum or minimum vapor pressures at a particular temperature, are broader than the range of compositions that have a change in vapor pressure of less than about 10% when 80 weight percent of the composition is evaporated, the unexpected intermolecular forces are nonetheless believed important in that the refrigerant compositions having those forces that are not substantially constant boiling may exhibit unexpected increases in the capacity or efficiency versus the components of the refrigerant composition.

By zeotropic is meant a non-constant boiling liquid mixture of two or more substances. Zeotropic mixtures boil over a wide temperature range under constant pressure conditions and create a temperature glide in the evaporator and condenser. This temperature glide can reduce the energy required to operate the system by taking advantage of the Lorenz cycle. The preferred method involves the use of counter flow evaporator and/or condenser heat exchangers in which the refrigerant and heat-transfer fluid flow counter-currently. This method decreases the temperature difference between the evaporating and condensing refrigerant but maintains a high enough temperature difference between the refrigerant and external heat-transfer fluid to effectively transfer heat. Another benefit of this type of system is that the pressure differences are also minimized. This can result in an improvement in energy efficiency and/or capacity versus conventional systems.

Herein a composition is zeotropic if, after 80 weight percent of the composition is removed such as by evaporation or boiling off, the difference in vapor pressure between the original composition and the composition remaining after 80 weight percent of the original composition has been removed is greater than about 10 percent.

Effective amounts of ammonia, pentafluoroethane and difluoromethane which form the zeotropic compositions of the present invention may be defined by the area enclosed by the following lines in FIG. 1, a ternary composition diagram of $NH_3$ (ammonia) HFC-125 (pentafluoroethane), and HFC-32 (difluoromethane): a straight line connecting point B to point E (points as earlier defined herein), a straight line connecting point E to point F, a straight line connecting point F to point C, and a straight line connecting point C to point B. A preferred zeotropic composition comprises 50–70 weight percent $NH_3$, 1–49 weight percent HFC-32 and 149 weight percent HFC-125.

For purposes of the present invention, effective amount is defined as the amount of each component of the inventive compositions which, when combined, results in the formation of an azeotropic, azeotrope-like, or zeotropic composition as defined herein. In the instance of azeotropic and azeotrope-like compositions, this definition includes the amounts of each component, which amounts may vary depending on the pressure applied to the composition so long as the azeotropic or azeotrope-like compositions continue to exist at the different pressures, but with possible different boiling points. Therefore, effective amount includes the amounts, such as may be expressed in weight percentages, of each component of the compositions of the instant invention which form azeotropic, azeotrope-like, or zeotropic compositions at temperatures or pressures other than as described herein.

It is possible to characterize, in effect, a constant boiling mixture which may appear under many guises, depending upon the conditions chosen, by any of several criteria:

The composition can be defined as an azeotrope of A, B, C (and D . . . ) since the very term "azeotrope" is at once both definitive and limitative, and requires that effective amounts of A, B, C (and D . . . ) for this unique composition of matter which is a constant boiling composition.

It is well known by those skilled in the art, that, at different pressures, the composition of a given azeotrope will vary at least to some degree, and changes in pressure will also change, at least to some degree, the boiling point temperature. Thus, an azeotrope of A, B, C (and D . . . ) represents a unique type of relationship but with a variable composition which depends on temperature and/or pressure. Therefore, compositional ranges, rather than fixed compositions, are often used to define azeotropes.

The composition can be defined as a particular weight percent relationship or mole percent relationship of A, B, C (and D . . . ), while recognizing that such specific values point out only one particular relationship and that in actuality, a series of such relationships, represented by A, B, C (and D . . . ) actually exist for a given azeotrope, varied by the influence of pressure.

An azeotrope of A, B, C (and D .. ) can be characterized by defining the compositions as an azeotrope characterized by a boiling point at a given pressure, thus giving identifying characteristics without unduly limiting the scope of the invention by a specific numerical composition, which is limited by and is only as accurate as the analytical equipment available.

The compositions of the present invention can be prepared by any convenient method including mixing or combining the desired amounts. A referred method is to weigh the desired component amounts and thereafter combine them in an appropriate container.

EXAMPLES

Specific examples illustrating the invention are given below. Unless otherwise stated therein, all percentages are by weight. It is to be understood that these examples are merely illustrative and in no way are to be interpreted as limiting the scope of the invention.

Example 1

Phase Study

A phase study is made on compositions of difluoromethane, pentafluoroethane and ammonia, wherein the composition is varied and vapor pressures measured at a constant temperature. An azeotropic composition is obtained as evidenced by the maximum vapor pressure observed and is identified as follows:

| $NH_3$/HFC-125/HFC-32 Wt %/Wt %/Wt % | Vapor Pressure (kPa) | T ° C. |
|---|---|---|
| 3.4/3.8/92.8 | 1111.7 | 10.0 |
| 3.5/3.1/93.4 | 1204.3 | 12.7 |
| 3.9/1.1/95.0 | 1483.7 | 20.0 |
| 4.0/0.4/95.6 | 1589.6 | 22.5 |

Example 2

Impact of Vapor Leakage on Vapor Pressure at 12.7° C.

A vessel is charged with an initial composition, allowed to equilibrate to 12.7° C., and the initial vapor pressure of the composition is measured. The composition is allowed to leak from the vessel, while the temperature is held constant at 12.7° C., until 80 weight percent of the initial composition is removed, at which time the vapor pressure of the composition remaining in the vessel is measured. The results are summarized below.

| Refrigerant Mixture, Wt % | | | Vapor Pressure, kPa | | % change |
|---|---|---|---|---|---|
| $NH_3$ | HFC-125 | HFC-32 | initial | after leak | in pressure |
| 1 | 1 | 98 | 1199.7 | 1199.1 | 0.05 |
| 1 | 3.5 | 95.5 | 1200.4 | 1199.9 | 0.04 |
| 1 | 98 | 1 | 969.8 | 956.1 | 1.41 |
| 3.5 | 1 | 95.5 | 1204.2 | 1204.2 | 0.00 |
| 3.5 | 3.1 | 93.4 | 1204.3 | 1204.3 | 0.00 |
| 3.5 | 5 | 91.5 | 1204.2 | 1204.1 | 0.00 |
| 3.5 | 10 | 86.5 | 1203.3 | 1203 | 0.02 |
| 5 | 3 | 92 | 1203.2 | 1202.6 | 0.05 |
| 5 | 5 | 90 | 1202.9 | 1202.1 | 0.07 |
| 5 | 10 | 85 | 1201.3 | 1199.7 | 0.13 |
| 5 | 90 | 5 | 956.8 | 932.2 | 2.57 |
| 10 | 3 | 87 | 1189.5 | 1175.7 | 1.16 |
| 10 | 5 | 85 | 1188.4 | 1173.7 | 1.24 |
| 10 | 10 | 80 | 1185 | 1167.6 | 1.47 |
| 15 | 15 | 70 | 1155.1 | 1106.6 | 4.20 |
| 20 | 20 | 60 | 1118.6 | 1038.4 | 7.17 |
| 20 | 75 | 5 | 925.3 | 903 | 2.41 |
| 23 | 1 | 76 | 1129 | 1037.1 | 8.14 |
| 25 | 25 | 50 | 1078 | 973.9 | 9.66 |
| 30 | 35 | 35 | 1020.7 | 908.9 | 10.95 |
| 30 | 65 | 5 | 906.8 | 866.3 | 4.47 |
| 40 | 59 | 1 | 873 | 795.3 | 8.90 |
| 98 | 1 | 1 | 689.9 | 674.2 | 2.28 |

The results of this Example show azeotropic or azeotrope-like compositions are present when after 80 wt % of an original composition is removed, the vapor pressure of the remaining composition is less than about 10% of the vapor pressure of the original composition, at a temperature of 12.7° C. This Example also shows a maximum pressure azeotrope at a composition of 3.5/3.1/93.4 weight percent $NH_3$/HFC-125/HFC-32.

Example 3

Impact of Vapor Leakage on Vapor Pressure at 25° C.

A vessel is charged with an initial composition, allowed to equilibrate to 25° C., and the initial vapor pressure of the composition is measured. The composition is allowed to leak from the vessel, while the temperature is held constant 25° C., until 80 weight percent of the initial composition is removed, at which time the vapor pressure of the composition remaining in the vessel is measured. The results are summarized below and in FIG. 1.

| Refrigerant Mixture, weight % | | | Vapor Pressure, kpa | | % change |
|---|---|---|---|---|---|
| $NH_3$ | HFC-125 | HFC-32 | initial | after leak | in pressure |
| 1 | 1 | 98 | 1694 | 1693.1 | 0.05 |
| 1 | 98 | 1 | 1365.4 | 1351.6 | 1 |
| 5 | 47.5 | 47.5 | 1628.3 | 1581.3 | 2.9 |
| 5 | 90 | 5 | 1361 | 1333 | 2.1 |
| 5 | 5 | 90 | 1700 | 1699 | 0.1 |
| 10 | 40 | 50 | 1614 | 1557 | 3.5 |
| 10 | 45 | 45 | 1597.1 | 1532.4 | 4.1 |
| 10 | 50 | 40 | 1577.6 | 1506.6 | 4.5 |
| 15 | 35 | 50 | 1588 | 1514 | 4.7 |
| 15 | 50 | 35 | 1531.1 | 1450.4 | 5.3 |
| 20 | 40 | 40 | 1526.6 | 1431.3 | 6.3 |
| 20 | 75 | 5 | 1336 | 1312.5 | 1.8 |
| 20 | 5 | 75 | 1618 | 1531 | 5.4 |
| 20 | 30 | 50 | 1561 | 1464.6 | 6.2 |
| 20 | 50 | 30 | 1483.9 | 1396.5 | 5.9 |

-continued

| Refrigerant Mixture, weight % | | | Vapor Pressure, kpa | | % change |
|---|---|---|---|---|---|
| NH₃ | HFC-125 | HFC-32 | initial | after leak | in pressure |
| 23 | 1 | 76 | 1602.9 | 1493 | 6.9 |
| 25 | 5 | 70 | 1582 | 1455 | 8 |
| 27.5 | 20 | 52.5 | 1529 | 1388 | 9.2 |
| 29 | 22 | 49 | 1511.4 | 1363.6 | 9.8 |
| 30 | 25 | 45 | 1494.1 | 1344.5 | 10 |
| 30 | 35 | 35 | 1459.1 | 1325.7 | 9.1 |
| 30 | 65 | 5 | 1313.4 | 1266 | 3.6 |
| 32 | 33 | 35 | 1450.2 | 1305.1 | 10 |
| 35 | 45 | 20 | 1376 | 1252 | 9 |
| 40 | 30 | 30 | 1398.7 | 1204 | 13.9 |
| 40 | 55 | 5 | 1289 | 1182.8 | 8.2 |
| 40 | 59 | 1 | 1268.7 | 1179.9 | 7 |
| 45 | 50 | 5 | 1277.5 | 1116.5 | 12.6 |
| 50 | 45 | 5 | 1266 | 1056.7 | 16.5 |
| 60 | 20 | 20 | 1289.6 | 1031.1 | 20 |
| 80 | 10 | 10 | 1168.6 | 1006 | 13.9 |
| 88 | 6 | 6 | 1109.4 | 1003.9 | 9.5 |
| 90 | 5 | 5 | 1093.2 | 1003.6 | 8.2 |
| 98 | 1 | 1 | 1022.2 | 1002.8 | 1.9 |

The results of this Example show azeotropic or azeotrope-like compositions are present when after 80 wt % of an original composition is removed, the vapor pressure of the remaining composition is less than about 10% of the vapor pressure of the original composition, at a temperature of 25° C. This Example also shows zeotropic compositions are present when after 80 wt % of an original composition is removed, the vapor pressure of the remaining composition is greater than about 10% of the vapor pressure of the original composition. For comparison, the commercial refrigerant HFC-32/1HFC-125/HFC-134a (23/25/52 wt %) is considered to be zeotropic. During a similar vapor leak, the vapor pressure of HFC-32/HFC-125HFC-134a (23/25/52 wt %) changes from 1185.2 kPa to 896.5 kPa which is equivalent to 24.4% change in vapor pressure.

Example 4

Refrigerant Performance

The following table shows the performance of various refrigerants. The data are based on the following conditions.

| | |
|---|---|
| Evaporator temperature | 5° C. |
| Condenser temperature | 50° C. |
| Return gas temperature | 25° C. |
| No Subcool | |

Compressor isentropic efficiency is 100%

The refrigeration capacity is based on a compressor with a fixed displacement of 0.1 cubic meter per minute at 100% isentropic compression. Capacity is intended to mean the change in enthalpy of the refrigerant in the evaporator per pound of refrigerant circulated, i.e. the heat removed by the refrigerant in the evaporator per time. Coefficient of Performance (COP) is intended to mean the ratio of the capacity to compressor work and is a measure of refrigerant energy efficiency.

| Refrigerant Mixture, weight % | | | Temp. Glide, deg. C. | | Compresser Discharge | Condenser | Capacity | |
|---|---|---|---|---|---|---|---|---|
| NH3 | R125 | R32 | Condenser | Evaporator | T, C. | Press., kpa | Watts | C.O.P. |
| 0 | 20 | 80 | 0 | 0 | 96.9 | 3132 | 9038 | 4.44 |
| 0 | 40 | 60 | 0.07 | 0.03 | 90.2 | 3092 | 8646 | 4.369 |
| 0 | 50 | 50 | 0.13 | 0.07 | 86.8 | 3056 | 8382 | 4.33 |
| 0 | 60 | 40 | 0.21 | 0.12 | 83.5 | 3006 | 8060 | 4.268 |
| 0 | 80 | 20 | 0.4 | 0.2 | 76.7 | 2842 | 7199 | 4.13 |
| 100 | 0 | 0 | 0 | 0 | 133.5 | 2033 | 6746 | 4.9 |
| 80 | 20 | 0 | 2.8 | 2.6 | 126.7 | 2183 | 7187 | 4.92 |
| 35 | 65 | 0 | 0.6 | 1.4 | 104.3 | 2469 | 7547 | 4.73 |
| 30 | 70 | 0 | 0.26 | 0.7 | 100.4 | 2497 | 7574 | 4.71 |
| 25 | 75 | 0 | 0.06 | 0.31 | 96.1 | 2517 | 7553 | 4.7 |
| 20 | 80 | 0 | 0 | 0.1 | 91.8 | 2524 | 7424 | 4.64 |
| 10 | 0 | 90 | 0.09 | 0.20 | 108.4 | 3151 | 9645 | 4.595 |
| 50 | 0 | 50 | 3.5 | 4.8 | 122.4 | 2576 | 8395 | 4.838 |
| 90 | 0 | 10 | 1.5 | 1.5 | 131.7 | 2130 | 7060 | 4.905 |
| 3.5 | 3.1 | 93.4 | 0 | 0 | 104.8 | 3172 | 9456 | 4.5 |
| 5 | 47.5 | 47.5 | 0.4 | 0.4 | 91.3 | 3017 | 8593 | 4.441 |
| 5 | 85 | 10 | 0.4 | 0.5 | 79.3 | 2634 | 7007 | 4.32 |
| 10 | 45 | 45 | 0.5 | 0.7 | 95.2 | 2974 | 8720 | 4.544 |
| 15 | 1 | 84 | 0.4 | 0.7 | 110.2 | 3094 | 9589 | 4.64 |
| 15 | 15 | 70 | 0.45 | 0.9 | 106.2 | 3055 | 9377 | 4.634 |
| 15 | 35 | 50 | 0.6 | 1 | 100.8 | 2965 | 8954 | 4.62 |
| 15 | 50 | 35 | 0.7 | 1 | 96.8 | 2866 | 8534 | 4.61 |
| 15 | 42.5 | 42.5 | 0.6 | 1.1 | 98.8 | 2919 | 8756 | 4.614 |
| 15 | 70 | 15 | 0.5 | 0.7 | 91.4 | 2688 | 7833 | 4.582 |
| 15 | 84 | 1 | 0.06 | 0.08 | 87.4 | 2531 | 7244 | 4.56 |
| 20 | 1 | 79 | 0.8 | 1.46 | 112.3 | 3023 | 9449 | 4.672 |
| 20 | 30 | 50 | 0.9 | 1.5 | 105 | 2914 | 8945 | 4.665 |
| 20 | 40 | 40 | 0.8 | 1.4 | 102.2 | 2858 | 8716 | 4.663 |
| 20 | 50 | 30 | 0.8 | 1.3 | 99.6 | 2791 | 8446 | 4.662 |
| 20 | 79 | 1 | 0.04 | 0.16 | 92.1 | 2535 | 7463 | 4.639 |

-continued

| Refrigerant Mixture, weight % | | | Temp. Glide, deg. C. | | Compresser Discharge | Condenser | Capacity | |
|---|---|---|---|---|---|---|---|---|
| NH3 | R125 | R32 | Condenser | Evaporator | T, C. | Press., kpa | Watts | C.O.P. |
| 30 | 35 | 35 | 1.5 | 2.6 | 108.5 | 2727 | 8485 | 4.717 |
| 40 | 30 | 30 | 2.4 | 3.8 | 113.5 | 2599 | 8239 | 4.783 |
| 50 | 25 | 25 | 3.1 | 4.4 | 117.6 | 2484 | 8025 | 4.848 |
| 60 | 20 | 20 | 3.5 | 4.4 | 121.3 | 2384 | 7806 | 4.895 |
| 70 | 15 | 15 | 3.4 | 3.8 | 125 | 2294 | 7556 | 4.903 |
| 80 | 10 | 10 | 2.8 | 2.7 | 128.4 | 2208 | 7280 | 4.898 |
| 90 | 5 | 5 | 1.7 | 1.4 | 131.2 | 2123 | 7021 | 4.903 |
| 95 | 2.5 | 2.5 | 0 | 0.75 | 132.5 | 2079 | 6871 | 4.896 |
| | | HCFC-22 | 0 | 0 | 89.3 | 1942 | 5920 | 4.76 |

Results of this Example show addition of $NH_3$ to HFC-32/HFC-125, as evidenced by comparing a 50/50 wt % mixture of HFC-32/HFC-125 to 15/35/50 wt % $NH_3$/HFC-125/HFC-32, results in significantly improved capacity and COP as well as lower compressor discharge pressure. Addition of HFC-125 to $NH_3$/HFC-32, as evidenced by comparing 50/50 wt % $NH_3$/HFC-32 with 15/35/50 wt % $NH_3$/HFC-125/HFC-32, results in significantly improved capacity, lower discharge temperature and reduced fractionation in the condenser and evaporator. Addition of HFC-32 to $NH_3$/HFC-125, as evidenced by comparing 20/80 wt % $NH_3$/BFC-125 with 20/50/30 wt % to $NH_3$/HFC-125/HFC-32 significantly improves capacity. Compositions of $NH_3$/HFC-125/HFC-32 also demonstrate improved capacity versus HCFC-22.

Example 5

Effect of Condenser Temperature on COP and Capacity

Figure 2:
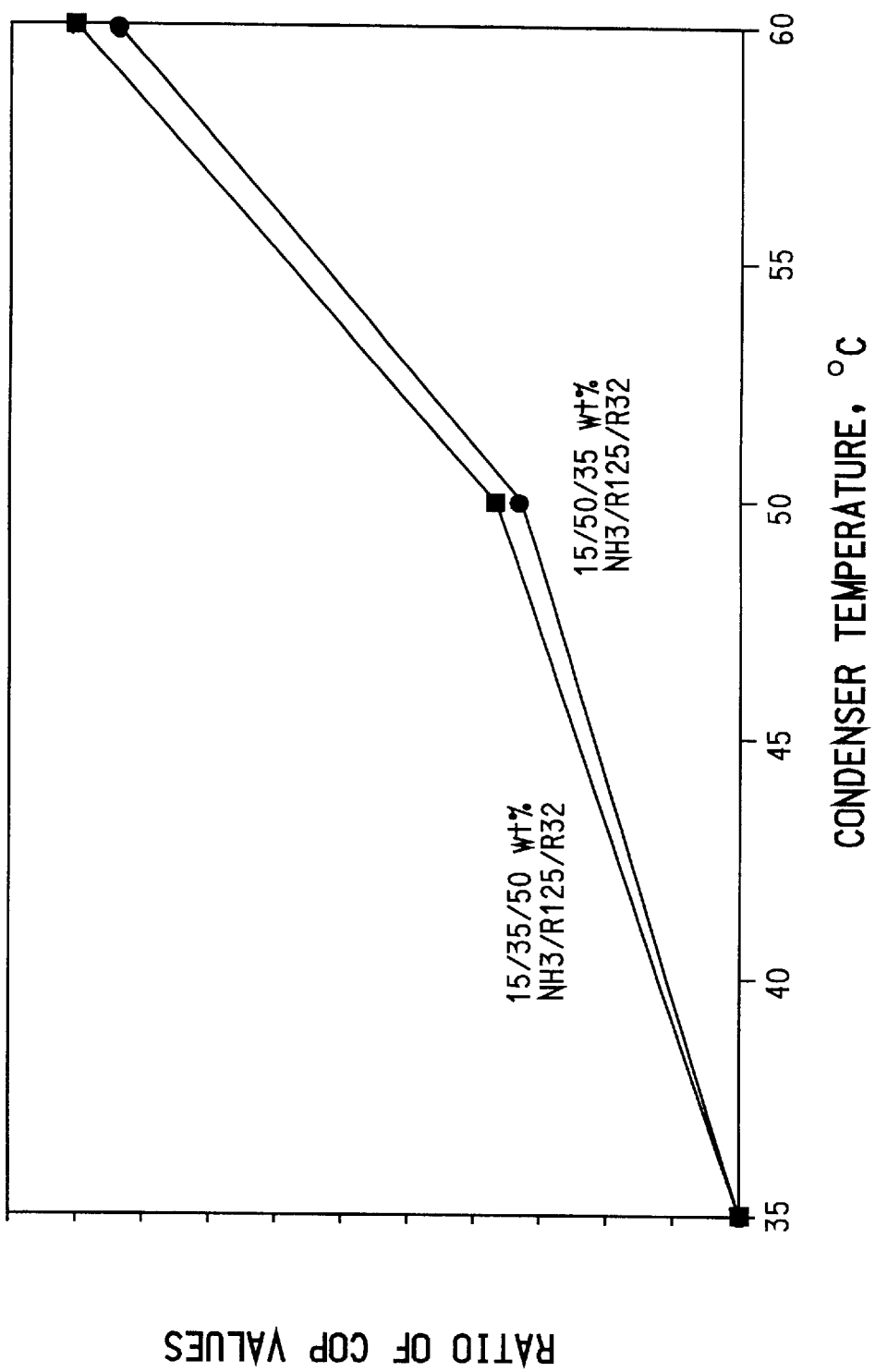
FIG. 2 is a graph of ratios of Coefficient of Performance (COP) values for ammonia/pentafluoroethane/difluoromethane and difluoromethane/pentafluoroethane versus condenser temperature.
Figure 3:
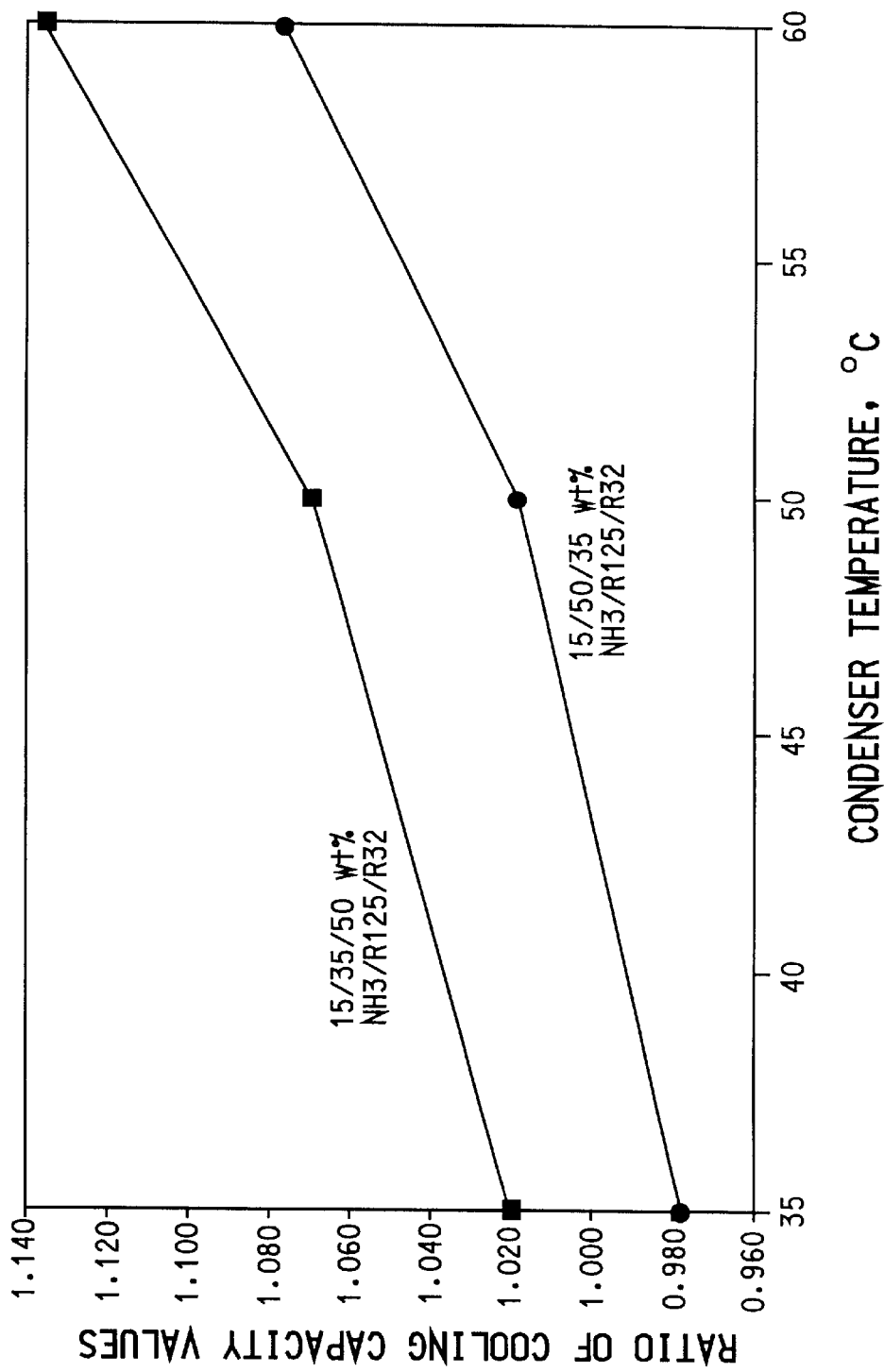
FIG. 3 is a graph of ratios of refrigeration capacity values for ammonia/pentafluoroethane/difluoromethane and difluoromethane/pentafluoroethane versus condenser temperature.

The following table shows the effect of COP and capacity as condenser temperature is varied. These data are also depicted in FIGS. 2 and 3. Results show the COP and capacity of 50/50 wt % HFC-32/HFC-125 decrease more than $NH_3$/HFC-125/HFC-32 compositions as condenser temperature is increased. This indicates improved performance of $NH_3$/HFC-125/HFC-32 compositions in higher ambient temperature conditions.

| Refrigerant Mixture, weight % | | | Cooling Capacity at Condenser Tmp. | | | COP at Condenser Temperature | | |
|---|---|---|---|---|---|---|---|---|
| NH$_3$ | HFC-125 | HFC-32 | 35 C. | 50 C. | 60 C. | 35 C. | 50 C. | 60 C. |
| 0 | 50 | 50 | 9846 | 8382 | 7190 | 7.355 | 4.328 | 3.103 |
| 15 | 50 | 35 | 9634 | 8534 | 7742 | 7.58 | 4.61 | 3.487 |
| 15 | 35 | 50 | 10039 | 8954 | 8173 | 7.583 | 4.62 | 3.507 |
| Ratio of ammonia mixtures over HFC-32/HFC125 mixture | | | 35 | 50 | 60 | 35 | 50 | 60 |
| 15 | 50 | 35 | 0.978 | 1.018 | 1.077 | 1.031 | 1.065 | 1.124 |
| 15 | 35 | 50 | 1.020 | 1.068 | 1.137 | 1.031 | 1.067 | 1.130 |

Additional Compounds

Other components, such as aliphatic hydrocarbons having a boiling point of about −100 to 100° C., hydrofluorocarbon alkanes having a boiling point of about −100 to 100° C., hydrofluoropropanes having a boiling point of between about 0 to 100° C., hydrocarbon esters having a boiling point between about 0 to 100° C., hydrochlorofluorocarbons having a boiling point between about −100 to 100° C., hydrofluorocarbons having a boiling point of about −100 to 100° C., hydrochlorocarbons having a boiling point between about −100 to 100° C., chlorocarbons and perfluorinated compounds, can been added in small amounts to the azeotropic or azeotrope-like compositions described above without substantially changing the properties thereof, including the constant boiling behavior, of the compositions.

Additives such as lubricants, corrosion inhibitors, surfactants, stabilizers, dyes and other appropriate materials may be added to the novel compositions of the invention for a variety of purposes provided that they do not materially affect the basic and novel characteristics of the present invention. Preferred lubricants include esters having a molecular weight greater than 25.

What is claimed is:

1. An azeotropic composition consisting essentially of from 1 to 5 weight % ammonia, from about 1 to about 10 weight % of pentafluoroethane, and from about 85 to about 98 weight % of difluoromethane, said composition having a vapor pressure of from about 1199.1 kPa to about 1204.3 kPa at a temperature of about 12.7° C.

2. An azeotropic or azeotrope-like composition consisting essentially of 5–35 weight percent ammonia, 5–90 weight percent pentafluoroethane, and 5–90 weight percent difluoromethane, wherein after 80 weight percent of said composition has evaporated at 25 degrees Celsius, the vapor pressure of the remaining composition has changed by 10 percent or less.

3. A process for producing refrigeration, comprising condensing a composition of claim 1 or 2, and thereafter evaporating said composition in the vicinity of a body to be cooled.

4. A process for producing heat, comprising condensing a composition of claim 1 or 2 in the vicinity of a body to be heated.

* * * * *